US011191010B2

(12) United States Patent
Quan et al.

(10) Patent No.: US 11,191,010 B2
(45) Date of Patent: Nov. 30, 2021

(54) SYSTEM INFORMATION TRANSMISSION METHOD AND APPARATUS

(71) Applicant: HUAWEI TECHNOLOGIES CO., LTD., Guangdong (CN)

(72) Inventors: Wei Quan, Beijing (CN); Yan Wang, Beijing (CN); Bingzhao Li, Beijing (CN); Jian Zhang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/793,596

(22) Filed: Feb. 18, 2020

(65) Prior Publication Data

US 2020/0187097 A1      Jun. 11, 2020

Related U.S. Application Data

(63) Continuation of application No. PCT/CN2018/100694, filed on Aug. 15, 2018.

(30) Foreign Application Priority Data

Aug. 18, 2017    (CN) .................... 201710712818.X

(51) Int. Cl.
*H04W 48/14* (2009.01)
*H04W 88/08* (2009.01)

(52) U.S. Cl.
CPC .......... *H04W 48/14* (2013.01); *H04W 88/085* (2013.01)

(58) Field of Classification Search
CPC .... H04W 48/14; H04W 76/10; H04W 88/085
USPC ....................................................... 455/434
See application file for complete search history.

(56) References Cited

U.S. PATENT DOCUMENTS

| 2008/0137637 A1* | 6/2008 | Cho ............... H04W 48/12 370/349 |
| 2016/0285716 A1 | 9/2016 | Pelletier et al. |
| 2017/0359840 A1* | 12/2017 | Ly .................. H04L 1/1671 |
| 2018/0083688 A1* | 3/2018 | Agiwal ............ H04W 12/033 |
| 2018/0092027 A1* | 3/2018 | Sheng ............. H04W 76/14 |

(Continued)

FOREIGN PATENT DOCUMENTS

| CN | 105075365 A | 11/2015 |
| CN | 105874745 A | 8/2016 |

(Continued)

OTHER PUBLICATIONS

3GPP TS 38.300 V0.5.0 (Jun. 2017), 3rd Generation Partnership Project, Technical Specification Group Radio Access Network, NR, NR and NG-RAN Overall Description (Release15), 55 pages.

(Continued)

*Primary Examiner* — Charles N Appiah
*Assistant Examiner* — Frank E Donado
(74) *Attorney, Agent, or Firm* — Fish & Richardson P.C.

(57) ABSTRACT

The present disclosure relates to system information transmission methods and apparatus. One example method includes receiving, by a first network node, at least one type of system information (SI) from a second network node, where the at least one type of SI includes first SI, receiving, by the first network node, a request message from a terminal device, where the request message is used to request the first SI, and sending, by the first network node, the first SI to the terminal device based on the request message and the at least one type of SI.

12 Claims, 5 Drawing Sheets

(56) References Cited

U.S. PATENT DOCUMENTS

| | | | |
|---|---|---|---|
| 2018/0213579 A1 | 7/2018 | Hong et al. | |
| 2019/0297542 A1* | 9/2019 | Tang | H04W 36/0061 |
| 2020/0022067 A1* | 1/2020 | Pan | H04W 48/14 |

FOREIGN PATENT DOCUMENTS

| | | | |
|---|---|---|---|
| CN | 107135502 A | 9/2017 | |
| CN | 107360557 A | 11/2017 | |
| CN | 109151737 A | 1/2019 | |
| EP | 3471463 A1 | 4/2019 | |
| EP | 3573353 A1 | 11/2019 | |
| EP | 3641478 A | 4/2020 | |
| WO | 2017010693 A | 1/2017 | |
| WO | 2017127440 A | 7/2017 | |

OTHER PUBLICATIONS

3GPP TS 38.473 V0.2 0, 3rd Generation Partnership Project, Technical Specification Group Radio Access Network, NG-RAN, F1 Application Protocol (F1AP) (Release 15), 19 pages.

Huawei, "CR to 38.473 on Corrections to System Information Delivery" Change Request, 3GPP TSG-RAN3 WG3 Meeting#AH-1807, Version 15.2.1, R3-184361, Montreal, Canada, Jul. 2-6, 2018, 9 pages.

Huawei, "CR to 38.473 on further clarifications on System information transfer over F1", Change Request, 3GPP TSG-RAN3 WG3 Meeting#AH-1807, Version 15.2.1, R3-184360, Montreal, Canada, Jul. 2-6, 2018, 3 pages.

Samsung, "(TP for NR BL CR for TS38.470): Discussions on on-demand SI support", 3GPP TSG-RAN3 WG3 Meeting#AH-1807, R3-183867,Montreal, Canada, Jul. 2-6, 2018, 2 pages.

Ericsson, "Introduction of SA" Change Request,3GPP TSG-RAN3 WG2 Meeting #102, Version 15.1.0, R2-1809239, Busan, South Korea, May 21-25, 2018, 448 pages.

ZTE, "Solution to UL AMBR for CU-DU" 3GPP TSG-RAN WG3 NR AdHoc 1807, Version 15.2.0, R3-184285, Montreal, Canada, Jul. 2-6, 2018, 2 pages.

PCT International Search Report and Written Opinion in International Application No. PCT/CN2018/100,694, dated Oct. 26, 2018, 17 pages (With English Translation).

Office Action issued in Chinese Application No. 201710712818.X dated Mar. 4, 2020, 20 pages (With English Translation).

Samsung, "On-demand SI support in high layer functional split", 3GPP TSG-RAN WG3 Meeting Ad Hoc, R3-172250, XP051302196, Qingdao, P. R. China, Jun. 27-29, 2017, 4 pages.

LG Electronics Inc.,"Discussion on system information management function", 3GPP TSG-RAN WG3 Meeting NR Adhoc, R3-172163, XP051302109, Qingdao, China, Jun. 27-29, 2017, 2 pages.

LG Electronics Inc.,"Functions of the F1 interface", 3GPP TSG-RAN WG3 Meeting #96, R3-171548, XP051276335, Hangzhou, China, May 15-19, 2017, 4 pages.

Extended European Search Report issued in European Application No. 18845842.6 dated Jun. 16, 2020, 11 pages.

Office Action issued in Chinese Application No. 201710712818.X dated Jan. 4, 2021, 9 pages.

Huawei, "System Information Delivery over F1," 3GPP TSG RAN WG3 #97, R3-173103, Berlin, Germany, Aug. 21-25, 2017, total 6 pages.

Office Action issued in Japanese Application No. 2020-509480 dated Mar. 23, 2021, 6 pages (with English translation).

\* cited by examiner

SYSTEM INFORMATION TRANSMISSION METHOD AND APPARATUS

CROSS-REFERENCE TO RELATED APPLICATIONS

This application is a continuation of International Application No. PCT/CN2018/100694, filed on Aug. 15, 2018, which claims priority to Chinese Patent Application No. 201710712818.X, filed on Aug. 18, 2017. The disclosures of the aforementioned applications are hereby incorporated by reference in their entireties.

TECHNICAL FIELD

This application relates to the communications field, and more specifically, to a system information transmission method and apparatus in the communications field.

BACKGROUND

In a communications system, a base station may include a centralized unit (centralized unit, CU) and a distributed unit (distributed unit, DU). To be specific, functions of the base station are divided, some functions of the base station are deployed in one CU, remaining functions are deployed in a plurality of DUs, and the plurality of DUs share the CU, thereby reducing costs and facilitating network expansion.

The functions of the base station may be deployed in the CU and the DUs based on functions of protocol layers of a protocol stack. One possible manner is deploying functions of a radio resource control (radio resource control, RRC) layer and a packet data convergence protocol (packet data convergence protocol, PDCP) layer in the CU, and functions of a remaining radio link control (radio link control, RLC) layer, media access control (media access control, MAC) layer, and physical layer (physical layer, PHY) in the DU.

In the prior art, before accessing a cell of the base station, a terminal device learns, by requesting system information (system information, SI) of the cell from the base station, of how the cell is configured, to correctly operate within coverage of the cell.

However, at present, there is no corresponding solution for providing a system information method in a CU-DU split architecture.

SUMMARY

This application provides a system information transmission method and apparatus, to transmit system information in a CU-DU split architecture.

According to a first aspect, this application provides a system information transmission method. The method includes:

receiving, by a first network node, at least one type of system information SI from a second network node, where the at least one type of SI includes first SI;

receiving, by the first network node, a request message from a terminal device, where the request message is used to request the first SI; and sending, by the first network node, the first SI to the terminal device based on the request message and the at least one type of SI.

It should be understood that, the terminal device may request one or more pieces of SI by using one request message. When the terminal device requests one piece of SI, the piece of SI may be understood as one type of SI. When the terminal device requests a plurality of pieces of SI, any two of the plurality of pieces of SI may be different types of SI.

It should be further understood that, one type of SI in this embodiment of this application may be understood as one type of SIB or a combination of a plurality of SIBs in the SI. This is not limited in this embodiment of this application.

According to the system information transmission method provided in this embodiment of this application, the second network node pre-sends the at least one type of SI to the first network node, and the at least one type of SI includes the first SI. Therefore, when receiving the request message that is sent by the terminal device and that is used to request the first SI, the first network node may directly send the first SI to the terminal device.

In other words, when receiving the request message of the terminal device, the first network node does not need to send the request message to the second network node. Correspondingly, the second network node does not need to send, to the first network node, SI requested by the terminal device, but pre-sends one or more types of SI to the first network node once, so that overheads of an interface message between the first network node and the second network node can be reduced.

In a possible implementation, the sending, by the first network node, the first SI to the terminal device based on the request message and the at least one type of SI includes: determining, by the first network node, the first SI based on the request message and the at least one type of SI; and sending, by the first network node, the first SI to the terminal device.

In a CU-DU split architecture, in this embodiment of this application, the first network node may be a DU, and the second network node may be a CU. In a possible protocol layer deployment manner, functions of an RLC layer, a MAC layer, and a PHY layer may be deployed in the first network node, and functions of an RRC layer and a PDCP layer may be deployed in the second network node.

When the request message is an RRC message, because the function of the RRC layer is not deployed in the second network node, the second network node cannot normally parse content carried in the RRC message.

In a possible implementation, the request message is an RRC message, and the receiving, by the first network node, a request message from a terminal device, where the request message is used to request the first SI includes: receiving, by the first network node, the request message from the terminal device through a first channel; and determining, by the first network node based on the first channel and a preset mapping relationship, that the request message is used to request the first SI, where the mapping relationship includes a correspondence between the first channel and the first SI.

Optionally, the mapping relationship may include a correspondence between at least one channel and at least one type of SI, the at least one channel includes the first channel, and the at least one type of SI includes the first SI.

Optionally, one channel may correspond to one piece of SI. For example, a channel 1 corresponds to SI 1. Alternatively, one channel may correspond to a plurality of pieces of SI. For example, a channel 2 corresponds to SI 2 and SI 3. Alternatively, a plurality of channels may correspond to one piece of SI. For example, all of a channel 3, a channel 4, and a channel 5 correspond to SI 4. This is not limited in this embodiment of this application.

It should be understood that the at least one channel may be, for example, a logical channel. Specifically, the at least one logical channel may be a newly designed logical channel between the terminal device and the first network node, is distinguished from other SRBs that are already used (for example, an SRB 0, an SRB1, and an SRB2), and is specially used to transmit, between the terminal device and the first network node, an RRC message used to request SI.

According to the system information transmission method provided in this embodiment of this application, the logical channel used to transmit the RRC message for requesting the SI is newly designed between the terminal device and the first network node, so that the terminal device can learn that the RRC message is used to request SI, and more specifically, the terminal device can learn that the RRC message is used to request the first SI, without a need to parse the RRC message.

In a possible implementation, the request message is an RRC message, and the receiving, by the first network node, a request message from a terminal device, where the request message is used to request the first SI includes: determining, by the first network node based on a subheader or particular bit information of a MAC layer of the request message and a preset mapping relationship, that the request message is used to request the first SI, where the mapping relationship includes correspondences between different subheaders or particular bit information of the MAC layer and one or more types of SI.

In a possible implementation, the method further includes: receiving, by the first network node, a transmission parameter of each of the at least one type of SI from the second network node, where the transmission parameter includes at least one of a transmission type, a transmission moment, a transmission period, and a quantity of transmission times; and the sending, by the first network node, the first SI to the terminal device based on the request message and the at least one type of SI includes: determining, by the first network node, the first SI and a transmission parameter of the first SI based on the request message, the at least one type of SI, and the transmission parameter of each of the at least one type of SI; and sending, by the first network node, the first SI to the terminal device based on the transmission parameter of the first SI.

According to the system information transmission method provided in this embodiment of this application, the second network node pre-sends the transmission parameter of each of the at least one type of SI to the first network node. Therefore, when sending the first SI to the terminal device, the first network node may directly send the first SI based on the transmission parameter of the first SI.

In other words, when sending the first SI to the terminal device, the first network node does not need to request the transmission parameter of the first SI from the second network node, and the second network node does not need to send the transmission parameter of the first SI to the first network node, but pre-sends transmission parameters of one or more types of SI to the first network node once, so that the overheads of the interface message between the first network node and the second network node can be reduced.

In a possible implementation, the sending, by the first network node, the first SI to the terminal device based on the request message and the at least one type of SI includes: sending, by the first network node, the request message to the second network node; receiving, by the first network node, instruction information from the second network node; and determining, by the first network node, the first SI based on the at least one type of SI and the instruction information, and sending the first SI to the terminal device.

According to the system information transmission method provided in this embodiment of this application, because the function of the RRC layer is deployed in the second network node, the first network node may send the request message to the second network node, and the second network node parses the request message. The second network node already delivers the at least one type of SI to the first network node, and therefore after learning, through parsing, that the request message is used to request the first SI, the second network node needs to send only the instruction information to the first network node, to instruct the first network node to send the first SI, in other words, the second network node does not need to send the first SI to the first network node. Therefore, the overheads of the interface message between the first network node and the second network node can also be reduced.

According to a second aspect, this application provides a system information transmission method. The method includes:

generating, by a second network node, at least one type of system information SI, where the at least one type of SI includes first SI; and before a first network node receives a request message that is sent by a terminal device and that is used to request the first SI, sending, by the second network node, the at least one type of SI to the first network node.

According to the system information transmission method provided in this embodiment of this application, the second network node pre-sends the at least one type of SI to the first network node, and the at least one type of SI includes the first SI. Therefore, when receiving the request message that is sent by the terminal device and that is used to request the first SI, the first network node may directly send the first SI to the terminal device.

In other words, when receiving the request message of the terminal device, the first network node does not need to send the request message to the second network node. Correspondingly, the second network node does not need to send, to the first network node, SI requested by the terminal device, but pre-sends one or more types of SI to the first network node once, so that overheads of an interface message between the first network node and the second network node can be reduced.

In a possible implementation, the method further includes: sending, by the second network node, a transmission parameter of each of the at least one type of SI to the first network node, where the transmission parameter includes at least one of a transmission type, a transmission moment, a transmission period, and a quantity of transmission times.

In a possible implementation, the method further includes: receiving, by the second network node, the request message sent by the first network node; and sending, by the second network node, instruction information to the first network node based on the request message, where the instruction information is used to instruct the first network node to send the first SI.

According to a third aspect, this application provides a system information transmission method. The method includes:

receiving, by a first network node, a plurality of request messages from at least one terminal device, where each of the plurality of request messages is used to request at least one type of system information SI;

sending, by the first network node, a first message to a second network node based on the plurality of request messages, where the first message includes one or more of the plurality of request messages;

receiving, by the first network node, the requested at least one type of SI from the second network node; and sending, by the first network node, the requested at least one type of SI to the at least one terminal device.

Optionally, the plurality of request messages may be sent by one terminal device or a plurality of terminal devices. This is not limited in this embodiment of this application.

It should be understood that, each of the plurality of request messages may be used to request at least one piece of SI, and the at least one piece of SI may be different types of SI. To be specific, each request message may be used to request the at least one type of SI. The plurality of request messages may be used to request a plurality of pieces of SI. However, the plurality of pieces of SI may be one or more types of SI.

It should be understood that the first network node communicates with the second network node by using an interface message. Therefore, after receiving the plurality of request messages from the terminal device, the first network node may encapsulate the request message into an interface message (namely, the first message), and send the interface message to the second network node.

According to the system information transmission method provided in this embodiment of this application, after the first network node receives the plurality of request messages, the first network node may send one or more of the plurality of request messages to the second network node by using an interface message (namely, the first message). In other words, each time the first network node receives one of the plurality of request messages, the first network node does not need to send the request message to the second network node by using an interface message, so that signaling overheads can be reduced.

It should be understood that, types of SI requested by using request messages sent by different terminal devices may partially or completely overlap. Therefore, the requested at least one type of SI sent by the second network node to the first network node may be some or all pieces of SI requested by using the plurality of request messages. This is not limited in this embodiment of this application.

It should be further understood that in a specific implementation process, limited by a transmission mechanism, a transmission scenario, or the like, the second network node cannot send, to the first network node, all the pieces of SI requested by using the plurality of request messages.

In a possible implementation, the sending, by the first network node, a first message to a second network node based on the plurality of request messages includes: generating, by the first network node, the first message based on the plurality of request messages; and sending, by the first network node, the first message to the second network node.

It should be understood that the first network node communicates with the second network node by using an interface message. Therefore, after receiving the plurality of request messages from the terminal device, the first network node may encapsulate the request message into an interface message (namely, the first message), and send the interface message to the second network node.

In a possible implementation, when same SI is requested by using at least two of the plurality of request messages, the first message includes only one of the at least two request messages.

According to the system information transmission method provided in this embodiment of this application, the first network node may perform combined processing on the at least two request messages for requesting same SI, and the first message includes only one of the at least two request messages, so that interface message overheads can be further reduced.

In a possible implementation, the sending, by the second network node, the requested at least one type of SI to the first network node based on the first message includes: generating, by the second network node, the requested at least one type of SI based on the first message; and sending the requested at least one type of SI to the first network node.

In a possible implementation, the sending, by the second network node, the requested at least one type of SI to the first network node based on the first message includes: generating, by the second network node, a second message based on the requested at least one type of SI, where the second message carries the requested at least one type of SI; and sending the second message to the first network node.

According to the system information transmission method provided in this embodiment of this application, the second network node encapsulates the requested at least one type of SI into an interface message (namely, the second message), and sends the interface message to the first network node, so that the interface message overheads can be reduced.

In a possible implementation, the method further includes: receiving, by the first network node, a transmission parameter of each of the at least one type of SI from the second network node, where the transmission parameter includes at least one of a transmission type, a transmission moment, a transmission period, and a quantity of transmission times; and the sending, by the first network node, the requested at least one type of SI to the at least one terminal device includes: sending, by the first network node, the requested at least one type of SI to the at least one terminal device based on the transmission parameter of each type of SI.

According to the system information transmission method provided in this embodiment of this application, the first network node pre-obtains the transmission parameter of each of the at least one type of SI from the second network node. Therefore, when sending the first SI to the terminal device, the first network node may directly send the first SI based on the transmission parameter of the first SI, so that the overheads of the interface message between the first network node and the second network node can be reduced.

In a possible implementation, the receiving, by the first network node, the requested at least one type of SI from the second network node includes: receiving, by the first network node, a second message from the second network node, where the second message carries the requested at least one type of SI.

According to a fourth aspect, this application provides a system information transmission method. The method includes:

receiving, by a second network node, a first message from a first network node, where the first message includes one or more request messages, and each of the one or more request messages is used to request at least one type of system information SI; and sending, by the second network node, the requested at least one type of SI to the first network node based on the first message.

According to the system information transmission method provided in this embodiment of this application, after the first network node receives a plurality of request messages, the first network node may send one or more of the plurality of request messages to the second network node by using an interface message (namely, the first message). In other words, each time the first network node receives one of the plurality of request messages, the first network node does not need to send the request message to the second network node by using an interface message, so that signaling overheads can be reduced.

In a possible implementation, the sending, by the second network node, the requested at least one type of SI to the first network node based on the first message includes: generating, by the second network node, the requested at least one type of SI based on the first message; and sending, by the second network node, the requested at least one type of SI to the first network node.

In a possible implementation, the sending, by the second network node, the requested at least one type of SI to the first network node includes: generating, by the second network node, a second message based on the requested at least one type of SI, where the second message carries the requested at least one type of SI; and sending, by the second network node, the second message to the first network node.

In a possible implementation, the method further includes: sending, by the second network node, a transmission parameter of each of the requested at least one type of SI to the first network node, where the transmission parameter includes at least one of a transmission type, a transmission moment, a transmission period, and a quantity of transmission times.

According to a fifth aspect, this application provides a system information transmission apparatus, configured to perform the method according to any one of the first aspect or the possible implementations of the first aspect.

According to a sixth aspect, this application provides a system information transmission apparatus, configured to perform the method according to any one of the second aspect or the possible implementations of the second aspect.

According to a seventh aspect, this application provides a system information transmission apparatus, configured to perform the method according to any one of the third aspect or the possible implementations of the third aspect.

According to an eighth aspect, this application provides a system information transmission apparatus, configured to perform the method according to any one of the fourth aspect or the possible implementations of the fourth aspect.

According to a ninth aspect, this application provides a system information transmission apparatus. The apparatus includes a memory, a processor, a transceiver, and a computer program that is stored in the memory and that can run on the processor, and when executing the computer program, the processor performs the method according to any one of the first aspect or the possible implementations of the first aspect.

According to a tenth aspect, this application provides a system information transmission apparatus. The apparatus includes a memory, a processor, a transceiver, and a computer program that is stored in the memory and that can run on the processor, and when executing the computer program, the processor performs the method according to any one of the second aspect or the possible implementations of the second aspect.

According to an eleventh aspect, this application provides a system information transmission apparatus. The apparatus includes a memory, a processor, a transceiver, and a computer program that is stored in the memory and that can run on the processor, and when executing the computer program, the processor performs the method according to any one of the third aspect or the possible implementations of the third aspect.

According to a twelfth aspect, this application provides a system information transmission apparatus. The apparatus includes a memory, a processor, a transceiver, and a computer program that is stored in the memory and that can run on the processor, and when executing the computer program, the processor performs the method according to any one of the fourth aspect or the possible implementations of the fourth aspect.

According to a thirteenth aspect, this application provides a computer readable medium, configured to store a computer program. The computer program includes an instruction used to perform the method according to any one of the first aspect or the possible implementations of the first aspect.

According to a fourteenth aspect, this application provides a computer readable medium, configured to store a computer program. The computer program includes an instruction used to perform the method according to any one of the second aspect or the possible implementations of the second aspect.

According to a fifteenth aspect, this application provides a computer readable medium, configured to store a computer program. The computer program includes an instruction used to perform the method according to any one of the third aspect or the possible implementations of the third aspect.

According to a sixteenth aspect, this application provides a computer readable medium, configured to store a computer program. The computer program includes an instruction used to perform the method according to any one of the fourth aspect or the possible implementations of the fourth aspect.

According to a seventeenth aspect, this application provides a computer program product including an instruction. When the computer program product runs on a computer, the computer performs the method according to any one of the first aspect or the possible implementations of the first aspect.

According to an eighteenth aspect, this application provides a computer program product including an instruction. When the computer program product runs on a computer, the computer performs the method according to any one of the second aspect or the possible implementations of the second aspect.

According to a nineteenth aspect, this application provides a computer program product including an instruction. When the computer program product runs on a computer, the computer performs the method according to any one of the third aspect or the possible implementations of the third aspect.

According to a twentieth aspect, this application provides a computer program product including an instruction. When the computer program product runs on a computer, the computer performs the method according to any one of the fourth aspect or the possible implementations of the fourth aspect.

According to a twenty-first aspect, this application provides a chip, including an input interface, an output interface, at least one processor, and a memory. The input interface, the output interface, the processor, and the memory are connected through a bus, the processor is configured to execute code in the memory, and when the code is executed, the processor is configured to perform the method according to any one of the first aspect or the possible implementations of the first aspect.

According to a twenty-second aspect, this application provides a chip, including an input interface, an output interface, at least one processor, and a memory. The input interface, the output interface, the processor, and the memory are connected through a bus, the processor is configured to execute code in the memory, and when the code is executed, the processor is configured to perform the method according to any one of the second aspect or the possible implementations of the second aspect.

According to a twenty-third aspect, this application provides a chip, including an input interface, an output interface, at least one processor, and a memory. The input interface, the output interface, the processor, and the memory are connected through a bus, the processor is configured to execute code in the memory, and when the code is executed, the processor is configured to perform the method according to any one of the third aspect or the possible implementations of the third aspect.

According to a twenty-fourth aspect, this application provides a chip, including an input interface, an output interface, at least one processor, and a memory. The input interface, the output interface, the processor, and the memory are connected through a bus, the processor is configured to execute code in the memory, and when the code is executed, the processor is configured to perform the method according to any one of the fourth aspect or the possible implementations of the fourth aspect.

DESCRIPTION OF EMBODIMENTS

The following describes technical solutions of this application with reference to accompanying drawings.

Figure 1:
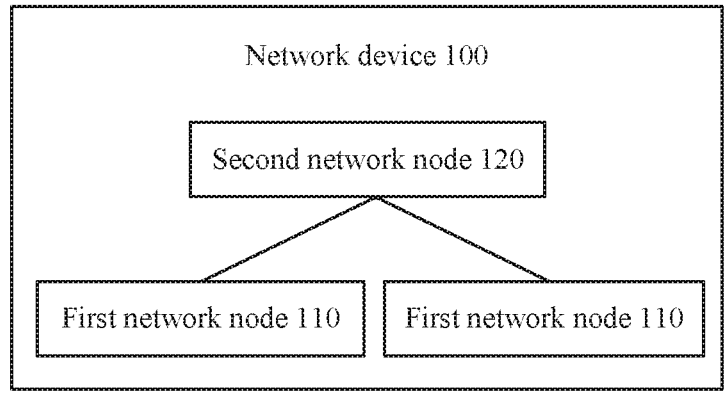
FIG. 1 is a schematic diagram of an application scenario of a technical solution according to an embodiment of this application.

FIG. 1 is a schematic diagram of an application scenario of a technical solution according to an embodiment of this application. As shown in FIG. 1, a network device 100 may be divided into at least one first network node 110 and a second network node 120 based on protocol layer functions.

Optionally, a plurality of first network nodes share one second network node, so that costs can be reduced and network expansion can be facilitated.

Optionally, the first network node 110 may be a DU in a CU-DU split cloud radio access network (cloud radio access network, CRAN) architecture, and the second network node 120 may be a CU in the architecture. This is not limited in this embodiment of this application.

Optionally, different protocol layers may be deployed in the first network node 110 and the second network node 120. In a possible implementation, at least an RRC layer is deployed in the second network node, and at least a MAC layer and a PHY layer are deployed in the first network node.

For example, the first network node may include functions of the MAC layer and the PHY layer, and the second network node may include functions of the RRC layer, a service data adaptation protocol (service data adaptation protocol, SDAP) layer, a PDCP layer, and an RLC layer, or the second network node may include functions of the RRC layer, the PDCP layer, and the RLC layer.

For another example, the first network node may include functions of the RLC layer, the MAC layer and the PHY layer, and the second network node may include functions of the RRC layer, the SDAP layer, and the PDCP layer, or the second network node may include functions of the RRC layer and the PDCP layer.

It should be understood that the foregoing enumeration of the manners of deploying the protocol layers in the first network node and the second network node is merely examples for description, and should not be construed as any limitation to this application. The protocol layers deployed in the first network node or the second network node may be alternatively other protocol layers defined in an existing protocol (for example, the long term evolution (long term evolution, LTE) protocol) or a future protocol. This is not limited in this embodiment of this application.

Optionally, the protocol layers may be deployed in the first network node and the second network node in another manner. This is not limited in this embodiment of this application.

It should be understood that the functions of the protocol layers mentioned in this embodiment of this application may change. This is not limited in this embodiment of this application.

Optionally, the first network node 110 and the second network node 120 may be two functional modules that are physically or logically split, or may be two independent network elements. This is not limited in this embodiment of this application.

Optionally, in this embodiment of this application, protocol layers in a communication protocol stack of the network device 100 may be separately deployed in the first network node and the second network node.

Figure 2:
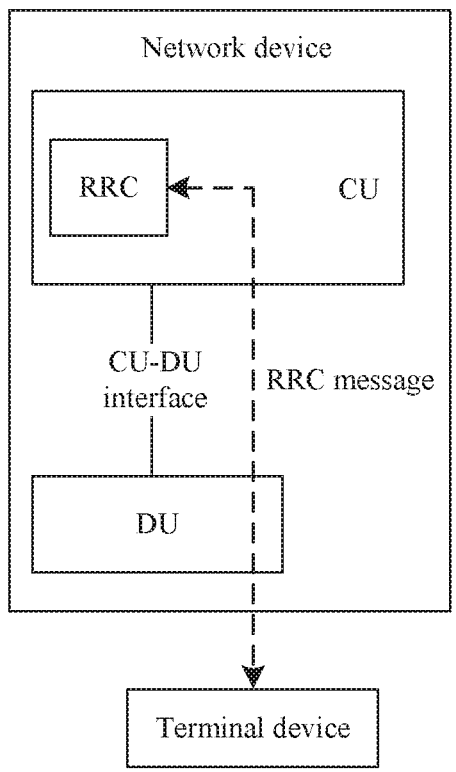
FIG. 2 is a schematic diagram of an application scenario of another technical solution according to an embodiment of this application.

FIG. 2 is a schematic diagram of another application scenario of a technical solution according to an embodiment of this application. As shown in FIG. 2, an RRC layer is deployed in a CU, and a MAC layer and a PHY layer are deployed in a DU. For an uplink RRC message, the DU receives, through an air interface, an RRC message sent by a terminal device, processes the RRC message, and then sends the processed RRC message to the CU through an interface between the CU and the DU. For a downlink RRC message, after generating an RRC message, the CU sends the RRC message to the DU through the interface between the CU and the DU, and the DU processes the RRC message, and sends the processed RRC message to the terminal device through the air interface.

It should be understood that, the technical solutions of the embodiments of this application may be applied to various communications systems, such as: a global system for mobile communications (global system of mobile communication, GSM) system, a code division multiple access (code division multiple access, CDMA) system, a wideband code division multiple access (wideband code division multiple access, WCDMA) system, a general packet radio service (general packet radio service, GPRS), an LTE system, an LTE frequency division duplex (frequency division duplex, FDD) system, an LTE time division duplex (time division duplex, TDD), a universal mobile telecommunication system (universal mobile telecommunication system, UMTS), a worldwide interoperability for microwave access (worldwide interoperability for microwave access, WiMAX) communications system, a wireless local area network (wireless local area network, WLAN), or a future fifth generation wireless communications system (the fifth Generation, 5G).

Specifically, in a 3rd generation mobile communications technology (3rd-generation, 3G) UMTS system, there is a scenario in which a radio network control node and a base station are split. In an LTE system, there are: a scenario in which a baseband module and a radio frequency module are split, namely, a remote radio frequency scenario; a data center (data center, DC) scenario in which interconnection between two different networks is required; a scenario of macro and micro base stations, where there is an interface for a connection between the macro and micro base stations; and an LTE+Wi-Fi aggregation (LTE+wifi aggregation, LWA) scenario. In a 5G system, there are: various non-cell (non-cell) scenarios (where a terminal may be freely and randomly handed over between various cells, and there is no clear boundary between the cells), where a control node is connected to all cells, or all transmission nodes are connected to the cell; a CRAN scenario, which is a BBU division scenario; and a CRAN virtualization scenario, where some functions of a BBU are centrally deployed and virtualized, the remaining functions are separately deployed, and the two parts may be physically and separately deployed. It should be understood that different system/ standard coexisting scenarios are within the application scope of this application.

Optionally, a network device in this embodiment of this application may provide communication coverage for a particular geographical area, and may communicate with UE located in the coverage. The network device may be a base transceiver station (base transceiver station, BTS) in a GSM system or a CDMA system, or may be a NodeB (nodeB, NB) in a WCDMA system, or may be an evolved NodeB (evolved node B, eNB or eNodeB) in an LTE system, or may be a radio controller in a cloud radio access network (cloud radio access network, CRAN). The network device may be alternatively a core network, a relay station, an access point, an in-vehicle device, a wearable device, a network side device in a future 5G network, a network device in a future evolved public land mobile network (public land mobile network, PLMN), or the like.

Optionally, the terminal device in this embodiment of this application may be movable or fixed. The terminal device may be an access terminal, user equipment (user equipment, UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device having a wireless communication function, another processing device connected to a wireless modem, an in-vehicle device, a wearable device, a terminal device in a future 5G network, a terminal device in a further evolved PLMN, or the like.

In the prior art, SI is generated by an RRC layer in the network device. The network device may receive a request message from the terminal device, and the request message is used to request first SI. The network device sends the first SI to the terminal device based on the request message.

However, there is no system information method for a CU-DU split architecture.

Figure 3:
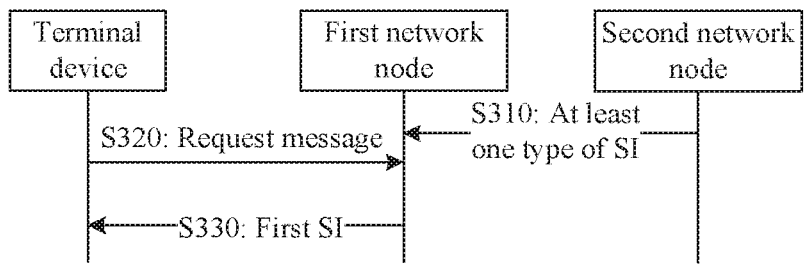
FIG. 3 is a schematic flowchart of a system information transmission method according to an embodiment of this application.

FIG. 3 is a schematic flowchart of a system information transmission method 300 according to an embodiment of this application. The method 300 may be applied to the application scenario shown in FIG. 1 or FIG. 2. However, this embodiment of this application is not limited thereto.

S310: A second network node sends at least one type of SI to a first network node, where the at least one type of SI includes first SI. Correspondingly, the first network node receives the at least one type of SI from the second network node.

It should be understood that, a terminal device may request one or more pieces of SI by using one request message. When the terminal device requests one piece of SI, the piece of SI may be understood as one type of SI. When the terminal device requests a plurality of pieces of SI, any two of the plurality of pieces of SI may be different types of SI.

It should be understood that, system information SI is organized by using a system information block (system information block, SIB), the SI may include a master information block (Master system information, MIB) and at least one type of SIB, and each type of SIB includes a series of parameter sets related to a function.

For example, a SIB 1 includes a parameter used to determine whether a cell is appropriate for cell selection and other SIB time domain scheduling information, a SIB 2 includes common or shared channel information and the like, and a SIB 3 includes a mobility-related parameter, for example, some parameters used for neighboring cell reselection, and the like.

It should be further understood that, one type of SI in this embodiment of this application may be understood as one type of SIB or a combination of a plurality of SIBs in the SI. This is not limited in this embodiment of this application.

S320: A terminal device sends a request message to the first network node, where the request message is used to request the first SI. Correspondingly, the first network node receives the request message from the terminal device.

Optionally, the first SI may be understood as SI requested by the terminal device. Specifically, the first SI may include one or more types of SI. This is not limited in this embodiment of this application.

S330: The first network node sends the first SI to the terminal device based on the request message and the at least one type of SI. Correspondingly, the terminal device receives the first SI from the first network node.

Optionally, the first network node may determine the first SI based on the request message and the at least one type of SI, and send the first SI to the terminal device.

According to the system information transmission method provided in this embodiment of this application, the second network node pre-sends the at least one type of SI to the first network node, and the at least one type of SI includes the first SI. Therefore, when receiving the request message that is sent by the terminal device and that is used to request the first SI, the first network node may directly send the first SI to the terminal device.

In other words, when receiving the request message of the terminal device, the first network node does not need to send the request message to the second network node. Correspondingly, the second network node does not need to send, to the first network node, SI requested by the terminal device, but pre-sends one or more types of SI to the first network node once, so that overheads of an interface message between the first network node and the second network node can be reduced.

Optionally, if the at least one type of SI does not include the first SI, the first network node may request the first SI from the second network node, or the first network node does not feed back, to the terminal device, the first SI requested by the terminal device. This is not limited in this embodiment of this application.

Optionally, before S330, the second network node may send a transmission parameter of each of the at least one type of SI to the first network node. Correspondingly, the first network node receives the transmission parameter of each of the at least one type of SI from the second network node. Optionally, S330 may be: the first network node determines the first SI and a transmission parameter of the first SI based on the request message, the at least one type of SI, and the transmission parameter of each of the at least one type of SI; and the first network node sends the first SI to the terminal device based on the transmission parameter of the first SI.

Optionally, the transmission parameter includes at least one of a transmission type, a transmission moment, a transmission period, and a quantity of transmission times. This is not limited in this embodiment of this application.

It should be understood that in this embodiment of this application, a transmission type of SI may include the following two types:

A first type: SI of a minimum (minimum) type. The SI of the minimum type is SI that does not need to be requested by the terminal device and that is periodically sent by a network side device. The SI of the minimum type is related to camping on and accessing a cell by the terminal device.

A second type: SI of an on demand (on demand) type. The SI of the on demand type is sent only when the SI is requested by the terminal device. Usually, the SI of the on demand type is SI other than the SI related to camping on and accessing the cell, for example, SI related to a parameter required for measuring a neighboring cell, SI related to a parameter required for receiving a multimedia broadcast multicast function (multimedia broadcast multicast service, MBMS) service, SI related to a parameter required for receiving a single-cell point-to-multipoint transmission (single-cell point-to-multipoint, SCPTM) service, and SI related to a parameter required for receiving a (machine-type communication, MTC) service.

It should be understood that, one type of SI mentioned in this embodiment of this application may be a subset of the SI of the second type, to be specific, the SI of the second type further includes a plurality of types of SI, and the terminal device requests one or more of the plurality of types of SI by using the request message.

Optionally, a transmission moment of SI may be a subframe whose subframe number is N, or a subframe in a window time using a subframe whose subframe number is N as a reference, for example, a subframe in an N to N+window size (window size), or a subframe in an N−window size to N, or a subframe in a window size including N, where N is a positive integer. The first network node may choose, based on an actual load status, to send the first SI in at least one subframe in a window time, to be specific, the UE needs to detect, in the window time, the first SI sent by the first network node.

In an optional embodiment, the transmission parameter includes the transmission type and the transmission moment. When a transmission type of the first SI is the on demand type, and a transmission moment of the first SI is a subframe whose subframe number is M, where M is a positive integer, after receiving the request message, the first network node sends the first SI to the terminal device in a subframe whose subframe number is M.

Optionally, the at least one type of SI may be one or more types of SI. When the at least one type of SI is a plurality of types of SI, the plurality of types of SI may include second SI, and a transmission type of the second SI is the minimum type. The second network node may send a transmission parameter of the second SI to the first network node, and the first network node may send the second SI to the terminal device based on the transmission parameter of the second SI.

In another optional embodiment, the transmission parameter may include the transmission type, the transmission moment, and the transmission period. When the transmission type of the second SI is the minimum type, a quantity of transmission times of the second SI is 10, a transmission moment of the second SI is a subframe whose subframe number is Q, and a transmission period of the second SI is P subframes, where P and Q are positive integers, the first network node sends the second SI to the terminal device in subframes whose subframe numbers are Q, Q+P, Q+2P, . . . , and Q+9P.

According to the system information transmission method provided in this embodiment of this application, the second network node pre-sends the transmission parameter of each of the at least one type of SI to the first network node. Therefore, when sending the first SI to the terminal device, the first network node may directly send the first SI based on the transmission parameter of the first SI.

In other words, when sending the first SI to the terminal device, the first network node does not need to request the transmission parameter of the first SI from the second network node, and the second network node does not need to send the transmission parameter of the first SI to the first network node, but pre-sends transmission parameters of one or more types of SI to the first network node once, so that the overheads of the interface message between the first network node and the second network node can be reduced.

Optionally, in a CU-DU split architecture, in this embodiment of this application, the first network node may be a DU, and the second network node may be a CU. In a possible protocol layer deployment manner, functions of an RLC layer, a MAC layer, and a PHY layer may be deployed in the first network node, and functions of an RRC layer and a PDCP layer may be deployed in the second network node.

Optionally, the request message may be an RRC message or a random access preamble (random access preamble, RAP).

When the request message is a first RAP, the first network node may determine, based on the first RAP and a preset first mapping relationship, that the request message is used to request the first SI.

Optionally, the first mapping relationship in this embodiment of this application may include a correspondence between at least one RAP and at least one type of SI. The at least one RAP includes the first RAP, the at least one type of SI includes the first SI, and the first RAP corresponds to the first SI.

Optionally, one RAP may correspond to one piece of SI. For example, a RAP 1 corresponds to SI 1. Alternatively, one RAP may correspond to a plurality of pieces of SI. For example, a RAP 2 corresponds to SI 2 and SI 3. Alternatively, a plurality of RAPs may correspond to one piece of SI. For example, all of a RAP 3, a RAP 4, and a RAP 5 correspond to SI 4. This is not limited in this embodiment of this application.

When the request message is an RRC message, because the function of the RRC layer is not deployed in the second network node, the second network node cannot normally parse content carried in the RRC message.

For the foregoing problem, this embodiment of this application provides the following two possible solutions:

Manner 1:

In S310, the terminal device may send the request message to the first network node through a first channel. Correspondingly, the first network node receives the request message from the terminal device through the first channel, and determines, based on the first channel and a preset second mapping relationship, that the request message is used to request the first SI.

Optionally, the second mapping relationship may include a correspondence between at least one channel and at least one type of SI, the at least one channel includes the first channel, and the at least one type of SI includes the first SI.

Optionally, one channel may correspond to one piece of SI. For example, a channel 1 corresponds to SI 1. Alternatively, one channel may correspond to a plurality of pieces of SI. For example, a channel 2 corresponds to SI 2 and SI 3. Alternatively, a plurality of channels may correspond to one piece of SI. For example, all of a channel 3, a channel 4, and a channel 5 correspond to SI 4. This is not limited in this embodiment of this application.

It should be understood that the at least one channel may be, for example, a logical channel. Specifically, the at least one logical channel may be a newly designed logical channel between the terminal device and the first network node, is distinguished from other SRBs that are already used (for example, an SRB 0, an SRB1, and an SRB2), and is specially used to transmit, between the terminal device and the first network node, an RRC message used to request SI.

According to the system information transmission method provided in this embodiment of this application, the logical channel used to transmit the RRC message for requesting the SI is newly designed between the terminal device and the first network node, so that the terminal device can learn that the RRC message is used to request SI, and more specifically, the terminal device can learn that the RRC message is used to request the first SI, without a need to parse the RRC message.

Optionally, the first network node may further determine, based on different values of a subheader or particular bit information of the MAC layer of the request message, one or more types of SI corresponding to the subheader or the particular bit information of the MAC layer of the request message. A specific method is similar to Manner 1, and details are not described in this embodiment of this application.

Manner 2:

In S330, after receiving the request message from the terminal device, the first network node may send the request message to the second network node. Correspondingly, the second network node receives the request message, and sends instruction information to the first network node based on the request message, and the instruction information is used to instruct the first network node to send the first SI. Correspondingly, the first network node receives the instruction information from the second network node, determines the first SI based on the at least one type of SI and the instruction information, and sends the first SI to the terminal device.

It should be understood that the first network node communicates with the second network node by using an interface message. Therefore, after receiving the request message from the terminal device, the first network node may encapsulate the request message into an interface message, and send the interface message to the second network node.

According to the system information transmission method provided in this embodiment of this application, because the function of the RRC layer is deployed in the second network node, the first network node may send the request message to the second network node, and the second network node parses the request message. The second network node already delivers the at least one type of SI to the first network node, and therefore after learning, through parsing, that the request message is used to request the first SI, the second network node needs to send only the instruction information to the first network node, to instruct the first network node to send the first SI, in other words, the second network node does not need to send the first SI to the first network node. Therefore, the overheads of the interface message between the first network node and the second network node can also be reduced.

Optionally, in Manner 1, a logical channel may be newly established between the terminal device and the first network node. After the first network node determines, based on the logical channel, that the request message is used to request SI (where a specific type or specific types of SI cannot be determined), the terminal device may send the request message to the second network node by continuously using the method in Manner 2, receive instruction information from the second network node, and send the first SI to the terminal device based on the instruction information.

According to the system information transmission method provided in this embodiment of this application, although the first network node cannot determine, based on the newly established logical channel, that the request message is used to request the first SI, the first network node may determine, based on the logical channel, that the request message is used to request SI. In this case, instead of processing the request message based on an existing RRC message processing method (for example, transmission layer address allocation), the first network node directly sends the request message to the second network node, and the second network node parses the request message, so that occupation of a transmission address can be reduced, and processing complexity of the first network node can be reduced.

Optionally, in S330, the first network node may broadcast the first SI. Alternatively, the request message carries an identifier of the terminal device, and the first network node sends the first SI to the terminal device based on the identifier of the terminal device. This is not limited in this embodiment of this application.

It should be understood that information about a transmission type of each type of SI may change, and the second network node may update the transmission type of each type of SI based on an actual transmission status of each type of SI.

In an optional embodiment, when the transmission type of the second SI is on demand, the second network node may count, in a first time period, a quantity of terminal devices or request messages that request the second SI, and update the transmission type of the second SI based on the quantity of request messages.

For example, if the quantity of terminal devices or request messages that request the second SI in the first time period is greater than a first preset value, the second network node may update the transmission type of the second SI to minimum, and determine, based on an actual transmission status, at least one of a transmission period, a quantity of transmission times, and a transmission moment of the second SI whose transmission type is minimum.

In an optional embodiment, when a transmission type of third SI is minimum, the second network node may update the transmission type of the third SI based on a status in which the terminal device initiates a service in a service cell such as a type of the initiated service or a quantity of initiated services, or based on a cell load status in a second time period.

For example, if in the second time period, cell load is relatively high, a service volume related to the third SI is relatively small, and the third SI does not need to be periodically sent, the second network node may update the transmission type of the third SI to on demand.

It should be understood that, the second SI or the third SI is any SI generated by the second network node, and a method for updating a transmission type of SI by the second network node is described in the foregoing embodiments by using only the second SI and the third SI as examples. This is not limited in this embodiment of this application.

According to the system information transmission method provided in this embodiment of this application, the second network node can update a transmission type of SI based on an actual transmission status, so that the SI can be properly transmitted, thereby improving overall SI transmission performance.

Figure 4:
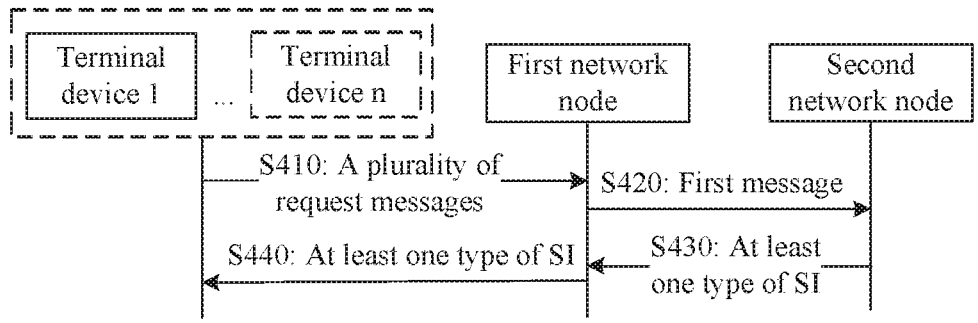
FIG. 4 is a schematic flowchart of another system information transmission method according to an embodiment of this application.

FIG. 4 shows a system information transmission method 400 according to an embodiment of this application. The method 400 may be applied to the application scenario shown in FIG. 1 or FIG. 2. However, this embodiment of this application is not limited thereto.

S410: At least one terminal device sends a plurality of request messages to a first network node, where each of the plurality of request messages is used to request at least one type of SI. Correspondingly, the first network node receives the plurality of request messages from the at least one terminal device.

Optionally, the plurality of request messages may be sent by one terminal device or a plurality of terminal devices. This is not limited in this embodiment of this application.

It should be understood that, each of the plurality of request messages may be used to request at least one piece of SI, and the at least one piece of SI may be different types of SI. To be specific, each request message may be used to request the at least one type of SI. The plurality of request messages may be used to request a plurality of pieces of SI. However, the plurality of pieces of SI may be one or more types of SI.

S420: The first network node sends a first message to a second network node based on the plurality of request messages, where the first message includes one or more of the plurality of request messages. Correspondingly, the second network node receives the first message from the first network node.

Optionally, the first network node may generate the first message based on the plurality of request messages, and send the first message to the second network node.

It should be understood that the first network node communicates with the second network node by using an interface message. Therefore, after receiving the plurality of request messages from the terminal device, the first network node may encapsulate the request message into an interface message (namely, the first message), and send the interface message to the second network node.

According to the system information transmission method provided in this embodiment of this application, after the first network node receives the plurality of request messages, the first network node may send one or more of the plurality of request messages to the second network node by using an interface message (namely, the first message). In other words, each time the first network node receives one of the plurality of request messages, the first network node does not need to send the request message to the second network node by using an interface message, so that signaling overheads can be reduced.

Optionally, when same SI is requested by using at least two of the plurality of request messages, the first message needs to carry only one of the at least two request messages.

For example, the plurality of request messages include a first request message and a second request message, the first request message is used to request SI 1 and SI 2, and the second request message is used to request the SI 2 and SI 3, so that the first message includes the first request message and the second request message.

For another example, the plurality of request messages include a first request message and a second request message, the first request message is used to request SI 1 and SI 2, and the second request message is also used to request the SI 1 and the SI 2, so that the first message includes the first request message or the second request message.

According to the system information transmission method provided in this embodiment of this application, the first network node may perform combined processing on the at least two request messages for requesting same SI, and the first message includes only one of the at least two request messages, so that interface message overheads can be further reduced.

S430: The second network node sends the requested at least one type of SI to the first network node based on the first message. Correspondingly, the first network node receives the requested at least one type of SI from the second network node.

Optionally, the second network node may generate the requested at least one type of SI based on the first message, and send the requested at least one type of SI to the first network node.

Optionally, the second network node may generate a second message based on the requested at least one type of SI, where the second message carries the requested at least one type of SI, and send the second message to the first network node. Correspondingly, the first network node receives the second message from the second network node.

According to the system information transmission method provided in this embodiment of this application, the second network node encapsulates the requested at least one type of SI into an interface message (namely, the second message), and sends the interface message to the first network node, so that the interface message overheads can be reduced.

It should be understood that, types of SI requested by using request messages sent by different terminal devices may partially or completely overlap. Therefore, the requested at least one type of SI sent by the second network node to the first network node may be some or all pieces of SI requested by using the plurality of request messages. This is not limited in this embodiment of this application.

It should be further understood that in a specific implementation process, limited by a transmission mechanism, a transmission scenario, or the like, the second network node cannot send, to the first network node, all the pieces of SI requested by using the plurality of request messages.

S440: The first network node sends the requested at least one type of SI to the at least one terminal device.

Optionally, before S430, the first network node may receive a transmission parameter of each of the at least one type of SI from the second network node, where the transmission parameter includes at least one of a transmission type, a transmission moment, a transmission period, and a quantity of transmission times. S440 may be: the first network node sends the requested at least one type of SI to the at least one terminal device based on the transmission parameter of each type of SI.

According to the system information transmission method provided in this embodiment of this application, the first network node pre-obtains the transmission parameter of each of the at least one type of SI from the second network node. Therefore, when sending first SI to the terminal device, the first network node may directly send the first SI based on a transmission parameter of the first SI, so that overheads of an interface message between the first network node and the second network node can be reduced.

Optionally, the first network node may broadcast the requested at least one type of SI. Alternatively, the first network node may send the at least one type of SI to each of the at least one terminal device based on an identifier carried in each request message.

Optionally, the at least one type of SI sent by the first network node to each terminal device may be some or all pieces of SI requested by each terminal device. This is not limited in this embodiment of this application.

Figure 5:
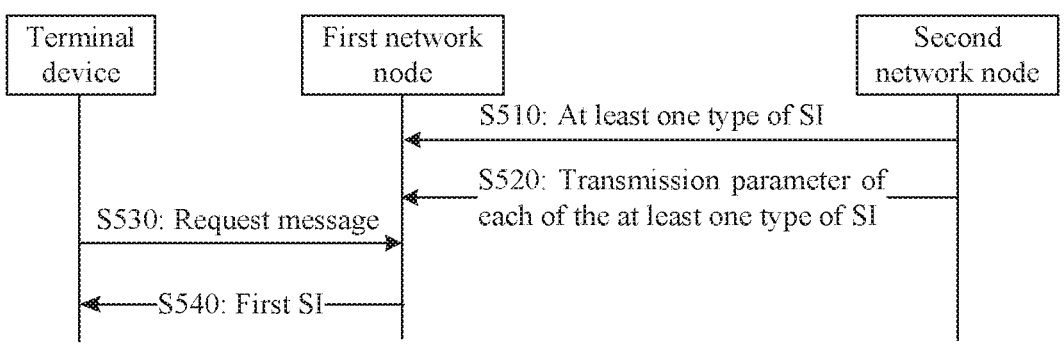
FIG. 5 is a schematic flowchart of still another system information transmission method according to an embodiment of this application.

FIG. 5 shows a system information transmission method 500 according to an embodiment of this application. The method 500 may be applied to the application scenario shown in FIG. 1 or FIG. 2. However, this embodiment of this application is not limited thereto.

S510: A second network node sends at least one type of SI to a first network node. Correspondingly, the first network node receives the at least one type of SI from the second network node.

For example, the first network node may receive SI 1, SI 2, and SI 3 from the second network node.

S520: The second network node sends a transmission parameter of each of the at least one type of SI to the first network node. Correspondingly, the first network node receives the transmission parameter of each of the at least one type of SI from the second network node.

For example, the first network node may receive a transmission parameter of the SI 1, a transmission parameter of the SI 2, and a transmission parameter of the SI 3 from the second network node.

Optionally, S510 and S520 may be simultaneously performed or separately performed. When S510 and S520 are separately performed, there may be no execution order. This is not limited in this embodiment of this application.

S530: The terminal device sends a request message to the first network node, where the request message is used to request first SI. Correspondingly, the first network node receives the request message from the terminal device.

For example, the first network node may receive the request message from the terminal device, and the request message is used to request the SI 1.

Optionally, when the request message is an RRC message, and an RRC layer is not deployed in the first network node, the request message may be parsed by using Manner 1 and Manner 2 in FIG. 3. To avoid repetition, details are not described herein again.

S540: The first network node sends the first SI to the terminal device based on the request message. Correspondingly, the terminal device receives the first SI from the first network node.

For example, the first network node sends the SI 1 to the terminal device based on the request message.

Figure 6:
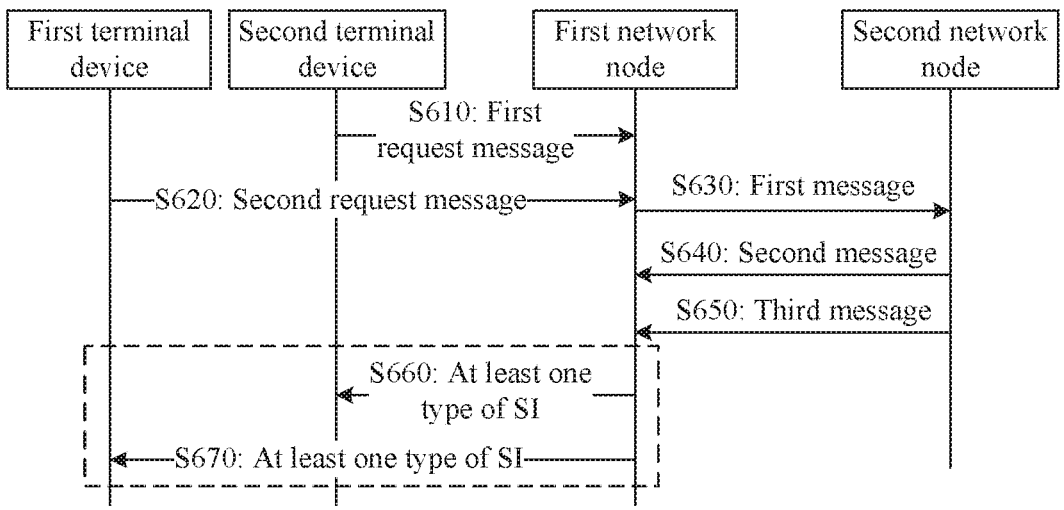
FIG. 6 is a schematic flowchart of still another system information transmission method according to an embodiment of this application.

FIG. 6 shows a system information transmission method 600 according to an embodiment of this application. The method 600 may be applied to the application scenario shown in FIG. 1 or FIG. 2. However, this embodiment of this application is not limited thereto.

S610: A first terminal device sends a first request message to a first network node, where the first request message is used to request at least one type of SI. Correspondingly, the first network node receives the first request message from the first terminal device.

S620: A second terminal device sends a second request message to the first network node, where the second request message is used to request at least one type of SI. Correspondingly, the first network node receives the second request message from the second terminal device.

Optionally, the first terminal device and the second terminal device may be different terminal devices; or may be a same terminal device, to be specific, the first terminal device or the second terminal device sends the first request message and the second request message.

Optionally, S610 and S620 may be simultaneously performed or separately performed. When S610 and S620 are separately performed, there may be no execution order. This is not limited in this embodiment of this application.

S630: The first network node sends a first message to a second network node based on the first request message and the second request message, where the first message includes the first request message and/or the second request message. Correspondingly, the second network node receives the first message from the first network node.

For example, the first request message is used to request SI 1 and SI 2, and the second request message is used to request the SI 2 and SI 3, so that the first message includes the first request message and the second request message.

For another example, the first request message is used to request SI 1 and SI 2, and the second request message is also used to request the SI 1 and the SI 2, so that the first message includes the first request message or the second request message.

S640: The second network node sends a second message to the first network node based on the first message, where the second message carries the requested at least one type of SI. Correspondingly, the first network node receives the second message from the second network node.

For example, the first request message is used to request the SI 1 and the SI 2, and the second request message is used to request the SI 2 and the SI 3, so that the second message may carry at least one the SI 1, the SI 2, and the SI 3. This is not limited in this embodiment of this application.

S650: The second network node sends a third message to the first network node based on the first message, where the third message carries a transmission parameter of each of the requested at least one type of SI. Correspondingly, the first network node receives the third message from the second network node.

S660: The first network node sends, to the first terminal device based on the third message, the at least one type of SI requested by the first terminal device. Correspondingly, the first terminal device receives, from the first network node, the at least one type of SI requested by the first terminal device.

S670: The first network node sends, to the second terminal device based on the third message, the at least one type of SI requested by the second terminal device. Correspondingly, the second terminal device receives, from the first network node, the at least one type of SI requested by the second terminal device.

It should be understood that in S640, the requested at least one type of SI includes the at least one type of SI requested by the first terminal device or the at least one type of SI requested by the second terminal device.

Optionally, S660 and S670 may be one step, to be specific, the first network node broadcasts the requested at least one type of SI based on the third message.

For example, the first request message is used to request the SI 1 and the SI 2, and the second request message is used to request the SI 2 and SI 3, so that the first network node can broadcast at least one of the SI 1, the SI 2, and the SI 3, or the first network node can send at least one of the SI 1 and the SI 2 to the first terminal device, and sends at least one of the SI 2 and the SI 3 to the second terminal device.

The system information transmission methods provided in the embodiments of this application are described above in detail with reference to FIG. 1 to FIG. 6, and system information transmission apparatuses provided in the embodiments of this application are described below with reference to FIG. 7 to FIG. 14.

Figure 7:
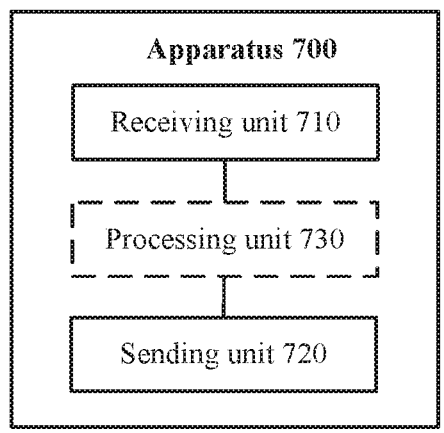
FIG. 7 is a schematic block diagram of a system information transmission apparatus according to an embodiment of this application.

FIG. 7 shows a system information transmission apparatus 700 according to an embodiment of this application. The apparatus 700 includes:

a receiving unit 710, configured to: receive at least one type of system information SI from a second network node, where the at least one type of SI includes first SI; and receive a request message from a terminal device, where the request message is used to request the first SI; and a sending unit 720, configured to send the first SI to the terminal device based on the request message and the at least one type of SI that are received by the receiving unit 710.

Optionally, the apparatus further includes a processing unit 730; the processing unit is configured to determine the first SI based on the request message and the at least one type of SI; and the sending unit is configured to send the first SI to the terminal device.

Optionally, the request message is an RRC message; the receiving unit is specifically configured to receive the request message from the terminal device through a first channel; and the processing unit is further configured to determine, based on the first channel and a preset mapping relationship, that the request message is used to request the first SI, where the mapping relationship includes a correspondence between the first channel and the first SI.

Optionally, the receiving unit is further configured to receive a transmission parameter of each of the at least one type of SI from the second network node, where the transmission parameter includes at least one of a transmission type, a transmission moment, a transmission period, and a quantity of transmission times; and the processing unit is further configured to determine the first SI and a transmission parameter of the first SI based on the request message, the at least one type of SI, and the transmission parameter of each of the at least one type of SI; and the sending unit is specifically configured to send the first SI to the terminal device based on the transmission parameter of the first SI.

Optionally, the sending unit is further configured to send the request message to the second network node; the receiving unit is further configured to receive instruction information from the second network node; the processing unit is further configured to determine the first SI based on the at least one type of SI and the instruction information; and the sending unit is further configured to send the first SI to the terminal device.

It should be understood that the apparatus 700 herein is represented in a form of a functional unit. The term "unit" herein may be an application-specific integrated circuit (application specific integrated circuit, ASIC), an electronic circuit, a processor for executing one or more software or firmware programs (for example, a shared processor, a proprietary processor, or a packet processor) and a memory, a combined logic circuit, and/or another appropriate component supporting the described function. In an optional example, a person skilled in the art may understand that the apparatus 700 may be specifically the first network node in the foregoing embodiments of the method 300 to the method 600, and the apparatus 700 may be configured to perform the procedures and/or steps corresponding to the first network node in the foregoing embodiments of the method 300 to the method 600. To avoid repetition, details are not described herein again.

Figure 8:
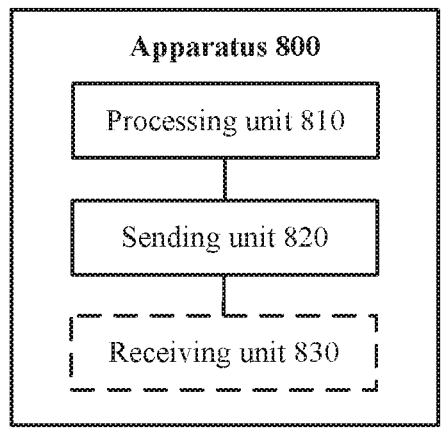
FIG. 8 is a schematic block diagram of another system information transmission apparatus according to an embodiment of this application.

FIG. 8 shows a system information transmission apparatus 800 according to an embodiment of this application. The apparatus 800 includes:

a processing unit 810, configured to generate at least one type of system information SI, where the at least one type of SI includes first SI; and a sending unit 820, configured to: before a first network node receives a request message that is sent by a terminal device and that is used to request the first SI, send the at least one type of SI generated by the processing unit 810 to the first network node.

Optionally, the sending unit is further configured to send a transmission parameter of each of the at least one type of SI to the first network node, where the transmission parameter includes at least one of a transmission type, a transmission moment, a transmission period, and a quantity of transmission times.

Optionally, the apparatus further includes a receiving unit 830; the receiving unit is configured to receive the request message sent by the first network node; and the sending unit is further configured to send instruction information to the first network node based on the request message, where the instruction information is used to instruct the first network node to send the first SI.

It should be understood that the apparatus 800 herein is represented in a form of a functional unit. The term "unit" herein may be an ASIC, an electronic circuit, a processor for executing one or more software or firmware programs (for example, a shared processor, a proprietary processor, or a packet processor) and a memory, a combined logic circuit, and/or another appropriate component supporting the described function. In an optional example, a person skilled in the art may understand that the apparatus 800 may be specifically the second network node in the foregoing embodiments of the method 300 to the method 600, and the apparatus 800 may be configured to perform the procedures and/or steps corresponding to the second network node in the foregoing embodiments of the method 300 to the method 600. To avoid repetition, details are not described herein again.

Figure 9:
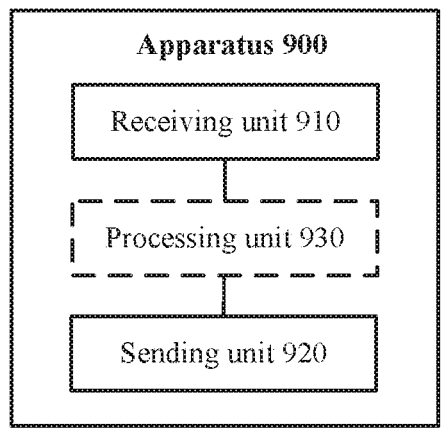
FIG. 9 is a schematic block diagram of still another system information transmission apparatus according to an embodiment of this application.

FIG. 9 shows a system information transmission apparatus 900 according to an embodiment of this application. The apparatus 900 includes:

a receiving unit 910, configured to receive a plurality of request messages from at least one terminal device, where each of the plurality of request messages is used to request at least one type of system information SI; and a sending unit 920, configured to send a first message to a second network node based on the plurality of request messages received by the receiving unit 910, where the first message includes one or more of the plurality of request messages, where the receiving unit 910 is further configured to receive the requested at least one type of SI from the second network node; and the sending unit 920 is further configured to send, to the at least one terminal device, the requested at least one type of SI that is received by the receiving unit.

Optionally, the apparatus further includes a processing unit 930; the processing unit is configured to generate the first message based on the plurality of request messages; and the sending unit is configured to send the first message to the second network node.

Optionally, when same SI is requested by using at least two of the plurality of request messages, the first message includes only one of the at least two request messages.

Optionally, the receiving unit is further configured to receive a transmission parameter of each of the at least one type of SI from the second network node, where the transmission parameter includes at least one of a transmission type, a transmission moment, a transmission period, and a quantity of transmission times; and the sending unit is specifically configured to send the requested at least one type of SI to the at least one terminal device based on the transmission parameter of each type of SI.

Optionally, the receiving unit is specifically configured to receive a second message from the second network node, where the second message carries the requested at least one type of SI.

It should be understood that the apparatus 900 herein is represented in a form of a functional unit. The term "unit" herein may be an ASIC, an electronic circuit, a processor for executing one or more software or firmware programs (for example, a shared processor, a proprietary processor, or a packet processor) and a memory, a combined logic circuit, and/or another appropriate component supporting the described function. In an optional example, a person skilled in the art may understand that the apparatus 900 may be specifically the first network node in the foregoing embodiments of the method 300 to the method 600, and the apparatus 900 may be configured to perform the procedures and/or steps corresponding to the first network node in the foregoing embodiments of the method 300 to the method 600. To avoid repetition, details are not described herein again.

Figure 10:
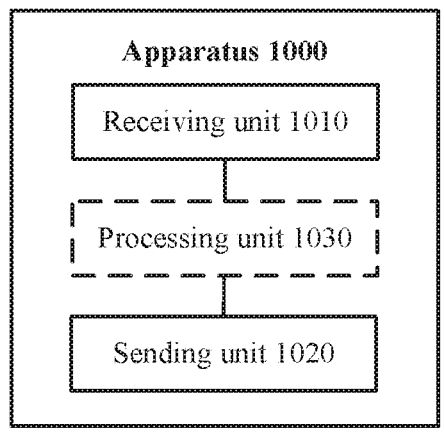
FIG. 10 is a schematic block diagram of still another system information transmission apparatus according to an embodiment of this application.

FIG. 10 shows a system information transmission apparatus 1000 according to an embodiment of this application. The apparatus 1000 includes:

a receiving unit 1010, configured to receive a first message from a first network node, where the first message includes one or more request messages, and each of the one or more request messages is used to request at least one type of system information SI; and a sending unit 1020, configured to send the requested at least one type of SI to the first network node based on the first message received by the receiving unit.

Optionally, the apparatus further includes a processing unit 1030; the processing unit is configured to generate the requested at least one type of SI based on the first message; and the sending unit is configured to send the requested at least one type of SI to the first network node.

Optionally, the processing unit is further configured to generate a second message based on the requested at least one type of SI, where the second message carries the requested at least one type of SI; and the sending unit is configured to send the second message to the first network node.

Optionally, the sending unit is further configured to send a transmission parameter of each of the requested at least one type of SI to the first network node, where the transmission parameter includes at least one of a transmission type, a transmission moment, a transmission period, and a quantity of transmission times.

It should be understood that the apparatus 1000 herein is represented in a form of a functional unit. The term "unit" herein may be an ASIC, an electronic circuit, a processor for executing one or more software or firmware programs (for example, a shared processor, a proprietary processor, or a packet processor) and a memory, a combined logic circuit, and/or another appropriate component supporting the described function. In an optional example, a person skilled in the art may understand that the apparatus 1000 may be specifically the second network node in the foregoing embodiments of the method 300 to the method 600, and the apparatus 1000 may be configured to perform the procedures and/or steps corresponding to the second network node in the foregoing embodiments of the method 300 to the method 600. To avoid repetition, details are not described herein again.

Figure 11:
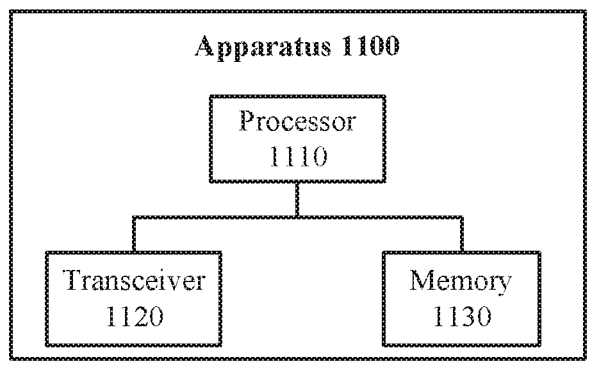
FIG. 11 is a schematic block diagram of still another system information transmission apparatus according to an embodiment of this application.

FIG. 11 shows a system information transmission apparatus 1100 according to an embodiment of this application. The apparatus 1100 may be the first network node shown in FIG. 1 or the DU (which is collectively referred to as the first network node) shown in FIG. 2, and a hardware architecture shown in FIG. 11 may be used in the first network node. The first network node may include a processor 1110, a transceiver 1120, and a memory 1130. The processor 1110, the transceiver 1120, and the memory 1130 communicate with each other by using an internal connection path. A related function implemented by the processing unit 730 in FIG. 7 may be implemented by the processor 1110, and related functions implemented by the receiving unit 710 and the sending unit 720 may be implemented by the processor 1110 by controlling the transceiver 1120.

The processor 1110 may include one or more processors, for example, one or more central processing units (central processing unit, CPU). When the processor is a CPU, the CPU may be a single-core CPU or may be a multi-core CPU.

The transceiver 1120 is configured to send and receive data and/or a signal. The transceiver may include a transmitter and a receiver, the transmitter is configured to send data and/or a signal, and the receiver is configured to receive data and/or a signal.

The memory 1130 includes but is not limited to a random access memory (random access memory, RAM), a read-only memory (read-only memory, ROM), an erasable programmable read only memory (erasable programmable read only memory, EPROM), and a compact disc read-only memory (compact disc read-only memory, CD-ROM). The memory 1130 is configured to store a related instruction and related data.

The memory 1130 is configured to store program code and data of the first network node. The memory 1130 may be an independent component or integrated into the processor 1110.

Specifically, the processor 1110 is configured to control the transceiver to communicate with a terminal device and/or a second network node. For details, refer to the descriptions in the method embodiments. Details are not described herein again.

It may be understood that FIG. 11 merely shows a simplified design of the first network node. In an actual application, the first network node may further include other necessary elements, including but not limited to any quantity of transceivers, processors, controllers, memories, and the like. All first network nodes that can implement this application fall within the protection scope of this application.

In a possible design, the apparatus 100 may be a chip, for example, a communications chip that can be used in the first network node and that is configured to implement a related function of the processor 1110 in the first network node. The chip may be a field programmable gate array, an application-specific integrated chip, a system chip, a central processing unit, a network processor, a digital signal processing circuit, or a microcontroller that can implement the related function, or may be a programmable controller or another integrated chip. Optionally, the chip may include one or more memories, configured to store program code, and when the code is executed, the processor is enabled to implement a corresponding function.

Figure 12:
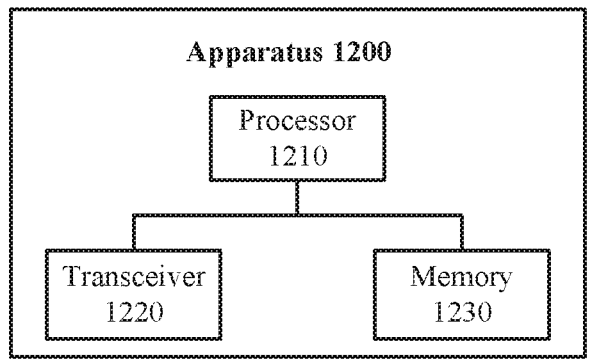
FIG. 12 is a schematic block diagram of still another system information transmission apparatus according to an embodiment of this application.

FIG. 12 shows a system information transmission apparatus 1200 according to an embodiment of this application. The apparatus 1200 may be the second network node shown in FIG. 1 or the CU (which is collectively referred to as the second network node) shown in FIG. 2, and a hardware architecture shown in FIG. 12 may be used in the second network node. The second network node may include a processor 1210, a transceiver 1220, and a memory 1230. The processor 1210, the transceiver 1220, and the memory 1230 communicate with each other by using an internal connection path. A related function implemented by the processing unit 810 in FIG. 8 may be implemented by the processor 1210, and related functions implemented by the sending unit 820 and the receiving unit 830 may be implemented by the processor 1210 by controlling the transceiver 1220.

The processor 1210 may include one or more processors, for example, one or more CPUs. When the processor is a CPU, the CPU may be a single-core CPU or may be a multi-core CPU.

The transceiver 1220 is configured to send and receive data and/or a signal. The transceiver may include a transmitter and a receiver, the transmitter is configured to send data and/or a signal, and the receiver is configured to receive data and/or a signal.

The memory 1230 includes but is not limited to a RAM, a ROM, an EPROM, and a CD-ROM. The memory 1230 is configured to store a related instruction and related data.

The memory 1230 is configured to store program code and data of the second network node. The memory 1230 may be an independent component or integrated into the processor 1210.

Specifically, the processor 1210 is configured to control the transceiver to communicate with a terminal device and/or the second network node. For details, refer to the descriptions in the method embodiments. Details are not described herein again.

It may be understood that FIG. 12 merely shows a simplified design of the second network node. In an actual application, the second network node may further include other necessary elements, including but not limited to any quantity of transceivers, processors, controllers, memories, and the like. All second network nodes that can implement this application fall within the protection scope of this application.

In a possible design, the apparatus 1200 may be a chip, for example, a communications chip that can be used in the second network node and that is configured to implement a related function of the processor 1210 in the second network node. The chip may be a field programmable gate array, an application-specific integrated chip, a system chip, a central processing unit, a network processor, a digital signal processing circuit, or a microcontroller that can implement the related function, or may be a programmable controller or another integrated chip. Optionally, the chip may include one or more memories, configured to store program code, and when the code is executed, the processor is enabled to implement a corresponding function.

Figure 13:
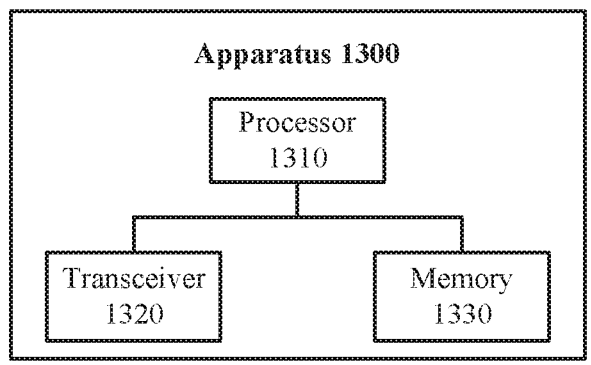
FIG. 13 is a schematic block diagram of still another system information transmission apparatus according to an embodiment of this application.

FIG. 13 shows a system information transmission apparatus 1300 according to an embodiment of this application. The apparatus 1300 may be the first network node shown in FIG. 1 or the DU (which is collectively referred to as the first network node) shown in FIG. 2, and a hardware architecture shown in FIG. 13 may be used in the first network node. The first network node may include a processor 1310, a transceiver 1320, and a memory 1330. The processor 1310, the transceiver 1320, and the memory 1330 communicate with each other by using an internal connection path. A related function implemented by the processing unit 930 in FIG. 9 may be implemented by the processor 1310, and related functions implemented by the receiving unit 910 and the sending unit 920 may be implemented by the processor 1310 by controlling the transceiver 1320.

The processor 1310 may include one or more processors, for example, one or more CPUs. When the processor is a CPU, the CPU may be a single-core CPU or may be a multi-core CPU.

The transceiver 1320 is configured to send and receive data and/or a signal. The transceiver may include a transmitter and a receiver, the transmitter is configured to send data and/or a signal, and the receiver is configured to receive data and/or a signal.

The memory 1330 includes but is not limited to a RAM, a ROM, an EPROM, and a CD-ROM. The memory 1330 is configured to store a related instruction and related data.

The memory 1330 is configured to store program code and data of the first network node. The memory 1330 may be an independent component or integrated into the processor 1310.

Specifically, the processor 1310 is configured to control the transceiver to communicate with a terminal device and/or a second network node. For details, refer to the descriptions in the method embodiments. Details are not described herein again.

It may be understood that FIG. 13 merely shows a simplified design of the first network node. In an actual application, the first network node may further include other necessary elements, including but is not limited to any quantity of transceivers, processors, controllers, memories, and the like. All first network nodes that can implement this application fall within the protection scope of this application.

In a possible design, the apparatus 1300 may be a chip, for example, a communications chip that can be used in the first network node and that is configured to implement a related function of the processor 1310 in the first network node. The chip may be a field programmable gate array, an application-specific integrated chip, a system chip, a central processing unit, a network processor, a digital signal processing circuit, or a microcontroller that can implement the related function, or may be a programmable controller or another integrated chip. Optionally, the chip may include one or more memories, configured to store program code, and when the code is executed, the processor is enabled to implement a corresponding function.

Figure 14:
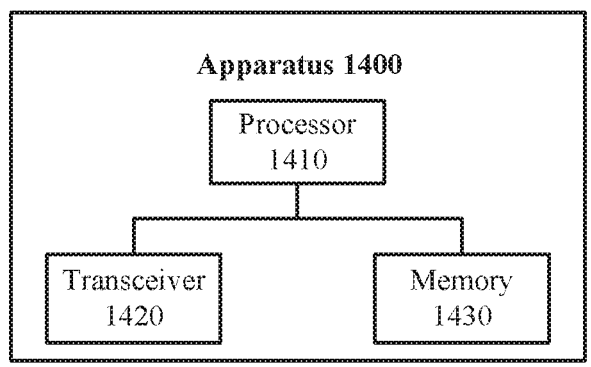
FIG. 14 is a schematic block diagram of still another system information transmission apparatus according to an embodiment of this application.

FIG. 14 shows a system information transmission apparatus 1400 according to an embodiment of this application. The apparatus 1400 may be the second network node shown in FIG. 1 or the CU (which is collectively referred to as the second network node) shown in FIG. 2, and a hardware architecture shown in FIG. 14 may be used in the second network node. The second network node may include a processor 1410, a transceiver 1420, and a memory 1430. The processor 1410, the transceiver 1420, and the memory 1430 communicate with each other by using an internal connection path. A related function implemented by the processing unit 1030 in FIG. 10 may be implemented by the processor 1410, and related functions implemented by the receiving unit 1010 and the sending unit 1020 may be implemented by the processor 1410 by controlling the transceiver 1420.

The processor 1410 may include one or more processors, for example, one or more CPUs. When the processor is a CPU, the CPU may be a single-core CPU or may be a multi-core CPU.

The transceiver 1420 is configured to send and receive data and/or a signal. The transceiver may include a transmitter and a receiver, the transmitter is configured to send data and/or a signal, and the receiver is configured to receive data and/or a signal.

The memory 1430 includes but is not limited to a RAM, a ROM, an EPROM, and a CD-ROM. The memory 1430 is configured to store a related instruction and related data.

The memory 1430 is configured to store program code and data of the second network node. The memory 1430 may be an independent component or integrated into the processor 1410.

Specifically, the processor 1410 is configured to control the transceiver to communicate with a terminal device and/or the second network node. For details, refer to the descriptions in the method embodiments. Details are not described herein again.

It may be understood that FIG. 14 merely shows a simplified design of the second network node. In an actual application, the second network node may further include other necessary elements, including but is not limited to any quantity of transceivers, processors, controllers, memories, and the like. All second network nodes that can implement this application fall within the protection scope of this application.

In a possible design, the apparatus 1400 may be a chip, for example, a communications chip that can be used in the second network node and that is configured to implement a related function of the processor 1410 in the second network node. The chip may be a field programmable gate array, an application-specific integrated chip, a system chip, a central processing unit, a network processor, a digital signal processing circuit, or a microcontroller that can implement the related function, or may be a programmable controller or another integrated chip. Optionally, the chip may include one or more memories, configured to store program code, and when the code is executed, the processor is enabled to implement a corresponding function.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instruction may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, including one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, an SSD), or the like.

A person of ordinary skill in the art may understand that all or some of the processes of the methods in the embodiments may be implemented by a computer program instructing relevant hardware. The program may be stored in a computer-readable storage medium. When the program is run, the processes of the foregoing method embodiments are performed. The foregoing storage medium includes: any medium that can store program code, such as a ROM a RAM, a magnetic disk, or an optical disc.

A person of ordinary skill in the art may be aware that, the examples of units and algorithm steps described with reference to the embodiments disclosed in this specification can be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system information transmission method, comprising:
   receiving, by a first network node, at least one type of system information (SI) from a second network node, wherein the at least one type of SI comprises first SI, the first SI being a first type of SI of the at least one type of SI;
   receiving, by the first network node, a request message from a terminal device, wherein the request message is used to request the first SI, and wherein the request message is a radio resource control (RRC) message;
   sending, by the first network node, the RRC message to the second network node;
   receiving, by the first network node, instruction information from the second network node, wherein the instruction information is used to instruct the first network node to send the first type of SI;
   determining, by the first network node, the first SI based on the at least one type of SI and the instruction information;
   receiving, by the first network node, a transmission parameter of each of the at least one type of SI from the second network node;
   determining, by the first network node, a transmission parameter of the first SI included in the transmission parameter of the at least one type of SI based on a preset mapping relationship comprising a correspondence between a first channel over which the request message was received from the terminal device and the first SI; and
   sending, by the first network node, the first SI to the terminal device based on the transmission parameter of the first SI, wherein the first network node is a distributed unit (DU), and the second network node is a centralized unit (CU) in a CU-DU split radio access network architecture over which the first type of SI is sent in response to the instruction information.

2. The method according to claim 1, wherein the transmission parameter of the first SI comprises at least one of a transmission type, a transmission moment, a transmission period, or a quantity of transmission times.

3. The method according to claim 1, wherein:
   the CU further hosts Service Data Adaptation Protocol (SDAP).

4. The method according to claim 1, wherein a transmission type of the first SI is on demand SI, and wherein the method further comprises:
   sending, by the first network node, the first SI periodically to the terminal device when the transmission type of the first SI is updated from the on demand SI to minimum SI.

5. A system information transmission method, comprising:
   generating, by a second network node, at least one type of system information (SI), wherein the at least one type of SI comprises first SI, the first SI being a first type of SI of the at least one type of SI;
   before a first network node receives a request message that is sent by a terminal device and that is used to request the first SI, sending, by the second network node, the at least one type of SI to the first network node;
   receiving, by the second network node, the request message from the first network node, wherein the request message is a radio resource control (RRC) message;
   sending, by the second network node, instruction information to the first network node based on the RRC message, wherein the instruction information instructs the first network node to send the first type of SI; and
   sending, by the second network node to the first network node, a transmission parameter of each of the at least one type of SI, wherein a transmission parameter of the first SI included in the transmission parameter of the at least one type of SI is determined by the first network node based on a preset mapping relationship comprising a correspondence between a first channel over which the request message was received from the terminal device and the first SI, wherein the first SI is sent by the first network node to the terminal device based on the transmission parameter of the first SI, and wherein the first network node is a distributed unit (DU) and the second network node is a centralized unit (CU) in a CU-DU split radio access network architecture over which the first type of SI is sent in response to the instruction information.

6. The method according to claim 5, wherein the transmission parameter of the first SI comprises at least one of a transmission type, a transmission moment, a transmission period, or a quantity of transmission times.

7. The method according to claim 6, wherein:
the CU further hosts Service Data Adaptation Protocol (SDAP).

8. The method according to claim 5, wherein a transmission type of the first SI is on demand SI, and wherein the method further comprises:
updating, by the second network node, the transmission type of the first SI from the on demand SI to minimum SI.

9. A system information transmission apparatus, comprising:
a receiver, the receiver configured to:
receive at least one type of system information (SI) from a second network node, wherein the at least one type of SI comprises first SI, the first SI being a first type of SI of the at least one type of SI; and
receive a request message from a terminal device, wherein the request message is used to request the first SI, and wherein the request message is a radio resource control (RRC) message;
a transmitter, the transmitter configured to send the RRC message to the second network node;
the receiver further configured to receive instruction information from the second network node, wherein the instruction information is used to instruct the apparatus to send the first type of SI;
at least one processor;
one or more memories coupled to the at least one processor and storing programming instructions for execution by the at least processor to determine the first SI based on the at least one type of SI and the instruction information;
the receiver further configured to receive a transmission parameter of each of the at least one type of SI from the second network node;
the programming instructions for execution by the at least processor to determine a transmission parameter of the first SI included in the transmission parameter of the at least one type of SI based on a preset mapping relationship comprising a correspondence between a first channel over which the request message was received from the terminal device and the first SI; and
the transmitter further configured to send the first SI to the terminal device based on the transmission parameter of the first SI, wherein the apparatus is a distributed unit (DU), and the second network node is a centralized unit (CU) in a CU-DU split radio access network architecture over which the first type of SI is sent in response to the instruction information.

10. The apparatus according to claim 9, wherein the transmission parameter of the first SI comprises at least one of a transmission type, a transmission moment, a transmission period, or a quantity of transmission times.

11. The apparatus according to claim 9, wherein:
the CU further hosts Service Data Adaptation Protocol (SDAP).

12. The apparatus according to claim 9, wherein a transmission type of the first SI is on demand SI, and wherein the transmitter is further configured to:
send the first SI periodically to the terminal device when the transmission type of the first SI is updated from the on demand SI to minimum SI.

* * * * *